(12) United States Patent
Leyko et al.

(10) Patent No.: US 9,915,227 B2
(45) Date of Patent: Mar. 13, 2018

(54) DISCHARGE SYSTEM OF A SEPARATED TWIN-FLOW TURBOJET FOR AN AIRCRAFT, CORRESPONDING TURBOJET AND ASSOCIATED DESIGN METHOD

(71) Applicant: SNECMA, Paris (FR)

(72) Inventors: Matthieu Leyko, Melun (FR); Jean Bertucchi, Thiais (FR); Arthur Droit, Paris (FR)

(73) Assignee: SNECMA, Paris (FR)

( * ) Notice: Subject to any disclaimer, the term of this patent is extended or adjusted under 35 U.S.C. 154(b) by 938 days.

(21) Appl. No.: 13/950,608

(22) Filed: Jul. 25, 2013

(65) Prior Publication Data

US 2014/0061331 A1 Mar. 6, 2014

(30) Foreign Application Priority Data

Jul. 26, 2012 (FR) ...................................... 12 57282

(51) Int. Cl.
*F02K 1/78* (2006.01)
*B64D 33/04* (2006.01)
(Continued)

(52) U.S. Cl.
CPC ................ *F02K 1/78* (2013.01); *B64D 33/04* (2013.01); *F02C 7/12* (2013.01); *F02K 1/52* (2013.01);
(Continued)

(58) Field of Classification Search
CPC ..... F02K 1/00; F02K 1/04; F02K 1/10; F02K 1/40; F02K 1/46; F02K 1/50; F02K 1/52;
(Continued)

(56) References Cited

U.S. PATENT DOCUMENTS

| | | | |
|---|---|---|---|
| 2,177,642 A | 10/1939 | Fellers | |
| 3,153,319 A | * 10/1964 | Young | ........................ F02K 1/46 181/215 |

(Continued)

FOREIGN PATENT DOCUMENTS

| | | |
|---|---|---|
| EP | 2 333 288 A2 | 6/2011 |
| FR | 2 966 435 | 4/2012 |

OTHER PUBLICATIONS

French Preliminary Search Report issued Apr. 23, 2013, in French Application No. 12 57282 filed Jul. 26, 2012 (with Written Opinion and English Translation of Categories of Cited Documents).

*Primary Examiner* — William H Rodriguez
*Assistant Examiner* — Jason H Duger
(74) *Attorney, Agent, or Firm* — Oblon, McClelland, Maier & Neustadt, L.L.P.

(57) ABSTRACT

A discharge system of a separated twin-flow turbojet for an aircraft, supported by a suspension mast, is disclosed. The system includes a main nozzle delimited by an annular cowl with a slot of annular shape defining upstream and downstream portions of the cowl and which is traversed by the suspension mast. The downstream portion of the cowl of the main nozzle includes a first part extending downstream from the upstream portion of the cowl to a trailing edge of the main nozzle, on either side of the suspension mast along two predefined angular sectors; and a second part formed from an internal contour of the slot and having a trailing edge with a diameter smaller than that of the trailing edge associated with the first part of the downstream portion of the cowl. Connecting walls laterally connect the first and second parts of the downstream portion.

10 Claims, 2 Drawing Sheets

(51) Int. Cl.
  *F02K 1/52*     (2006.01)
  *F02K 3/06*     (2006.01)
  *F02C 7/12*     (2006.01)

(52) U.S. Cl.
  CPC ............... *F02K 3/06* (2013.01); *Y02T 50/675* (2013.01); *Y10T 29/49346* (2015.01)

(58) Field of Classification Search
  CPC ..... F02K 1/78; F02K 3/06; F02K 1/34; F02K 3/86; B64D 29/06; B64D 33/04; B64D 33/06; F02C 7/12; Y10T 29/49346
  See application file for complete search history.

(56) References Cited

U.S. PATENT DOCUMENTS

| | | | |
|---|---|---|---|
| 4,773,593 A | 9/1988 | Auxier et al. | |
| 5,653,406 A | 8/1997 | Amano et al. | |
| 2008/0060343 A1* | 3/2008 | Narayanan | B64D 33/06 60/262 |
| 2010/0050651 A1* | 3/2010 | Dindar | B64D 33/04 60/770 |
| 2011/0120075 A1 | 5/2011 | Diaz et al. | |
| 2012/0118398 A1* | 5/2012 | Quarin | F02K 1/386 137/15.1 |

\* cited by examiner

DISCHARGE SYSTEM OF A SEPARATED TWIN-FLOW TURBOJET FOR AN AIRCRAFT, CORRESPONDING TURBOJET AND ASSOCIATED DESIGN METHOD

The present invention relates to twin-flow turbojets and more particularly separated twin-flow turbojets.

BACKGROUND OF THE INVENTION

It is known that, in a known manner, a twin-flow turbojet comprises:
- a hot-flow generator (also known as the main flow) which extends along a longitudinal axis and which is coupled by means of a front attachment and a rear attachment to a suspension mast belonging to the structure of an aircraft. The hot-flow generator is delimited by an annular cowl which forms the casing of the latter and which terminates downstream in a nozzle for discharging the main flow;
- a cold-flow fan of which the rotation axis is indistinguishable from the longitudinal axis of the hot-flow generator which rotates the latter; and
- a nacelle which surrounds the hot-flow generator and the cold-flow fan and which delimits an external channel of cold flow, that is asymmetrical relative to the longitudinal axis of the hot-flow generator and has an annular section around the latter. The cold flow, compressed by the fan, is thus guided toward the outside by the cold-flow channel.

It is also known that, in the case of a separated twin-flow turbojet, the main and bypass flows are discharged separately in two concentric flows. For this reason the nacelle comprises a casing surrounding the fan part which terminates downstream in a nozzle for discharging the bypass flow.

Furthermore, a ventilation flow travels along the hot-flow generator to cool it. In order to minimize performance losses, this ventilation flow must be discharged to the outside of the turbojet at a pressure close to the ambient pressure. For this, it is known practice to arrange a slot of circular shape in the cowl of the main nozzle of the turbojet through which the ventilation flow can escape. In particular, this slot extends on either side of the suspension mast of the turbojet and is delimited by two circular contours of different diameter: the diameter of the contour of the upstream portion of the cowl of the main nozzle being greater than that of the downstream portion of said cowl. In this manner, the ventilation flow escapes through the slot and then runs along the outer face of the downstream portion of the cowl of the main nozzle and is thus mixed with the bypass flow.

Moreover, and for reasons of fire safety, the certification authorities require the slot to be closed off on each lateral side of the mast over a determined angular sector (for example equal to 45°).

However, the closing-off of the slot—by means of a partition connecting, along the two predefined angular sectors, the upstream and downstream portions of the cowl of the main nozzle—results in the formation of a dog leg (or "step down") which disrupts the bypass flow on the main nozzle causing a recirculation of said flow. This leads to aerodynamic losses adversely affecting the performance of the turbojet.

To alleviate this drawback, an additional convex curved fairing is provided, in a known manner, to cover the dog leg formed by the partial closing-off of the slot. Such a fairing extends from said slot to the trailing edge of the main nozzle.

However, this curved fairing causes a great acceleration of the bypass flow and a risk of interaction with the canopy system supporting the turbojet, these factors being capable of causing undesirable aerodynamic losses.

SUMMARY OF THE INVENTION

The object of the present invention is to remedy these drawbacks and, in particular, to improve the discharge performance of such a separated-flow turbojet.

For this purpose, the present invention relates to a discharge system of a separated twin-flow turbojet for an aircraft, supported by a suspension mast, the discharge system comprising a main nozzle delimited by an annular cowl in which is arranged a slot of annular shape which defines an upstream portion and downstream portion of the cowl and which is traversed by the suspension mast of the turbojet. According to the invention, said discharge system is noteworthy in that the downstream portion of the cowl of the main nozzle comprises:
- a first part extending downstream the upstream portion of the cowl to a trailing edge of the main nozzle, on either side of the suspension mast along two predefined angular sectors; and
- a second part which is formed from an internal contour of the slot and which has a trailing edge with a diameter smaller than that of the trailing edge associated with the first part of the downstream portion of the cowl, the first and second parts of the downstream portion being connected laterally to one another with the aid of connecting walls.

Thus, by virtue of the invention, the dog leg that is present on the cowl of the main nozzle of a separated twin-flow turbojet, in the vicinity of the suspension mast of the latter, is removed. In this manner, the bypass flow can flow freely with no recirculation on the cowl of the main nozzle and no additional acceleration, because of the surface continuity between the upstream and downstream portions of said cowl on the two predefined angular sectors. Moreover, the increase in the diameter of the first part of the downstream portion, relative to that of the second part, prevent a voluminous dead hole from forming at the downstream end of the first part. The trailing edge of the main nozzle of the discharge system of the invention is therefore no longer asymmetrical.

Moreover, the first part of the downstream portion of the cowl is preferably defined by a generatrix straight line.

As a variant, the first part of the downstream portion of the cowl may have, in a longitudinal plane passing through the longitudinal axis of the discharge system, a concave curved line.

Moreover, the connecting walls can be respectively determined by a curved line (for example concave or convex), defined in a transverse plane orthogonal to the longitudinal axis of the discharge system, which preferably has a point of inflexion. As a variant, the connecting walls could be respectively determined by a straight-line segment, defined in a transverse plane orthogonal to the longitudinal axis of the discharge system.

Moreover, the present invention also relates to a separated twin-flow turbojet comprising a discharge system like that described above.

Moreover, the invention also relates to a method for designing the discharge system of a separated twin-flow turbojet for an aircraft in order to improve the performance of the discharge system, the turbojet being supported by a suspension mast and the discharge system comprising a main nozzle delimited by an annular cowl in which is arranged a slot of annular shape which defines an upstream portion and downstream portion of the cowl and which is traversed by the suspension mast of the turbojet.

This method is noteworthy in that the following steps are carried out:

the downstream portion of the cowl of the main nozzle is defined with the aid:
of a first part which extends downstream the upstream portion of the cowl to a trailing edge of the main nozzle, on either side of the suspension mast along two predefined angular sectors; and
of a second part which is formed from an internal contour of the slot and which has a trailing edge with a diameter smaller than that of the trailing edge associated with the first part of the downstream portion of the cowl, and
the lateral ends of the first and second parts of the downstream portion of the cowl thus defined are connected together with the aid of connecting walls.

This method makes it possible to design a discharge system of an aircraft turbojet as described above.

Moreover, the extension forming the first part of the downstream portion is preferably carried out along a generatrix straight line, for example parallel to a generatrix straight line of the upstream portion so as to achieve a rectilinear extension of the latter.

As a variant, the extension forming the first part of the downstream portion can be carried out along a concave curved line defined in a longitudinal plane passing through the longitudinal axis of the discharge system.

BRIEF DESCRIPTION OF THE DRAWINGS

The figures of the appended drawings will clearly explain how the invention can be embodied. In these figures, identical references indicate similar elements.

DESCRIPTION OF THE PREFERRED EMBODIMENTS

Figure 1:
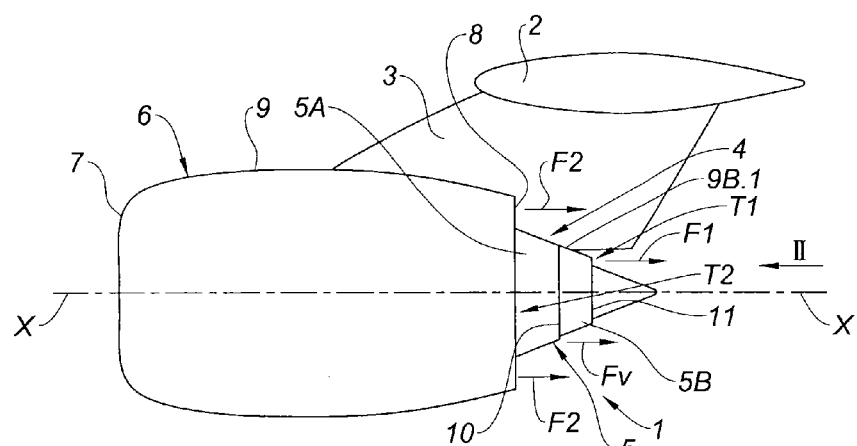
FIG. 1 is a schematic view in profile of an example of a separated twin-flow turbojet according to the present invention.

FIG. 1 shows an example of a separated twin-flow turbojet 1 according to the present invention, which is mounted under an aircraft wing 2 and which is suspended from the latter by means of a suspension mast 3.

In particular, and as mentioned above, the turbojet 1 comprises, in a known manner:

a hot-flow generator 4 (also called the main flow and symbolized by the arrow F1) delimited by an annular cowl 5 which forms the casing of the generator 4 and which terminates downstream in a discharge nozzle T1 of the main flow F1 (forming the main discharge system of the turbojet 1). The generator 4 extends along a longitudinal axis X-X and is coupled by means of a front attachment and a rear attachment to the suspension mast 3. The front attachment and the rear attachment are for example fastened respectively to the intermediate housing of a high-pressure compressor and to the exhaust housing of the hot flow F1 (not shown in the figures);

a cold-flow fan (not shown in FIG. 1) of which the rotation axis is indistinguishable from the longitudinal axis X-X of the hot-flow generator 4 which rotates the latter; and a nacelle 6 which surrounds the hot-flow generator 4 and the cold-flow fan and which delimits an external cold-flow channel, that is asymmetrical relative to the longitudinal axis X-X of the hot-flow generator 4 and has an annular section around the latter. The nacelle 6 is delimited, at its upstream end, by an air intake orifice 7 and, at its downstream end, by a cold-flow outlet orifice 8 (symbolized by the arrow F2). The cold flow F2, compressed by the fan, is thus guided to the outside by the cold-flow channel. For this purpose, the nacelle 6 comprises a casing 9 surrounding the fan part which terminates downstream in a discharge nozzle T2 of the bypass flow F2. The main flow F1 and bypass flow F2 are discharged separately in two concentric flows respectively by the discharge nozzles T1 and T2.

Figure 2:
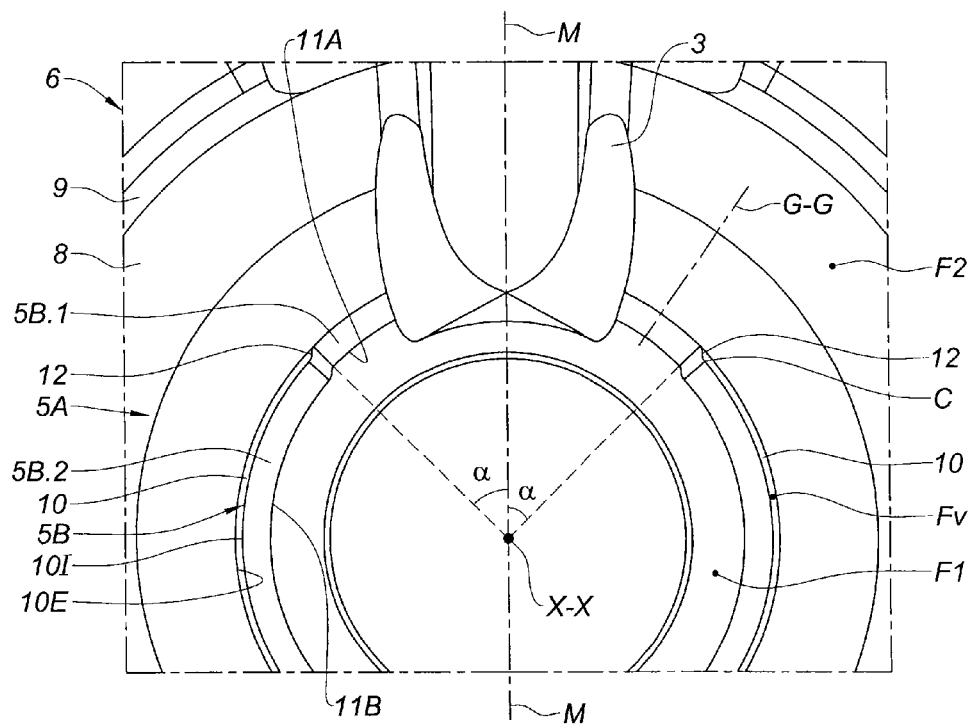
FIG. 2 represents schematically, in a partial, enlarged view in the direction of the arrow II of FIG. 1, the rear of a turbojet according to the invention.

Moreover, as shown by FIGS. 1 and 2, a slot 10 of annular shape is arranged in the cowl 5 of the main nozzle T1. The slot 10 defines the upstream portion 5A and downstream portion 5B of the cowl 5. It extends on either side of the suspension mast 3 of the turbojet and is delimited by the circular contours of the upstream portion 5A and downstream portion 5B of the cowl 5, the diameter of the external contour of the upstream portion 5A being greater than that of the downstream portion 5B at the level of the slot 10.

Thus, the ventilation flow Fv can emerge through the slot 10 so as to flow along the external face of the downstream portion 5B of the cowl 5 of the main nozzle T1.

According to the invention, as shown in FIG. 2, the downstream portion 5B of the cowl 5 of the main nozzle T1 comprises:

a first part 5B.1 which extends, along the axis X-X, the upstream portion 5A of the cowl 5 up to a trailing edge 11A of the main nozzle T1, on either side of the suspension mast 3 along two predefined identical angular sectors α (for example each equal to 45°). It will be noted that each angular sector a is defined relative to an axis M-M belonging to a mid-plane passing through the longitudinal axis X-X and the suspension mast 3. Naturally, as a variant, the predefined angular sectors could have different angular values; and a second part 5B.2 which is formed from an internal contour 10I of the slot 10 and which has a trailing edge 11B with a diameter smaller than that of the trailing edge 11A associated with the first part 5B.1 of the downstream portion 5B.

The trailing edges 11A and 11B, associated respectively with the first and second parts 5B.1 and 5B.2 of the downstream portion 5B, define the trailing edge of the main nozzle T1. It will therefore be understood that the trailing edge of the main nozzle T1 is not asymmetrical, unlike that associated with the known main nozzles.

In particular, in the example, the first part 5B.1 of the downstream portion 5B is defined by a generatrix straight line G-G of the upstream portion 5A. In other words, the surface of the first part 5B.1 of the downstream portion 5B is tangential to that of the upstream portion 5A. In this example, a rectilinear extension of the upstream portion 5B is therefore produced.

On the other hand, as shown in FIG. 2, the second part 5B.2 of the downstream portion 5B is obtained by a partial revolution of a generatrix parallel to the generatrix straight line G-G but offset radially toward the longitudinal axis X-X. Therefore, the downstream contour of the upstream portion 5A of the cowl 5 and the upstream contour of the second part 5B.2 of the downstream portion 5B—corresponding respectively to the external contour 10E and internal contour 10I of the slot 10—have different diameters: the diameter of the contour 10E being greater than that of the contour 10I.

Naturally, as a variant, the generatrix straight lines of the first and second parts of the downstream portion 5B can be inclined relative to one another, but also relative to the generatrix straight line of the upstream portion 5A. As a further variant, the first and second parts of the downstream portion 5B may each also be defined by a concave curved line belonging to a longitudinal plane passing through the axis X-X.

Furthermore, the thickness of the first and second parts 5B.1 and 5B.2 of the downstream portion 5B is identical and substantially constant along the longitudinal axis X-X and along a circumference of the downstream portion 5B, such that the downstream end of the main nozzle T1 has a constant slight thickness.

Figure 3:
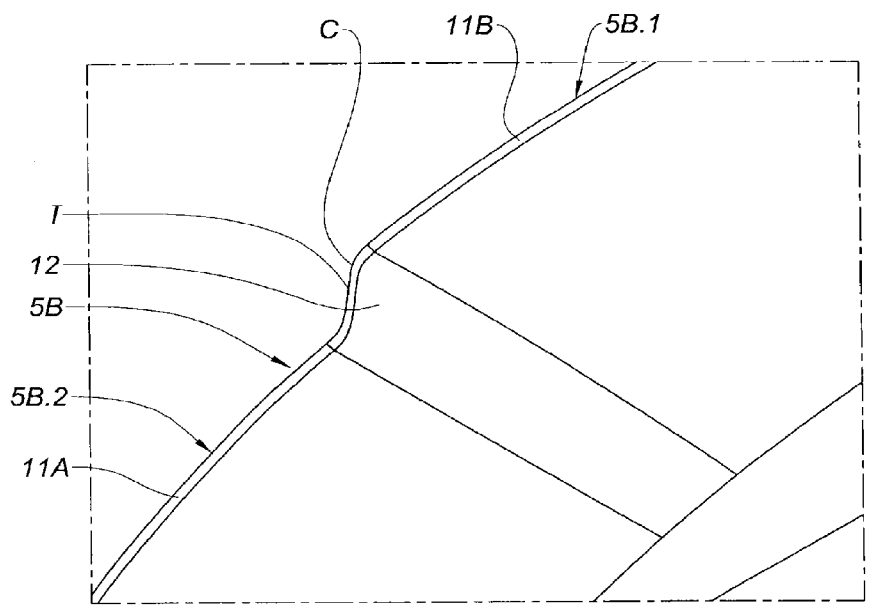
FIG. 3 illustrates partially, in a rear inclined view of the turbojet of FIG. 1, an enlargement of the trailing edge of the main nozzle of the turbojet.

Furthermore, as shown in FIGS. 2 and 3, the lateral ends of the first and second parts 5B.1 and 5B.2 of the downstream portion 5B of the cowl 5 are connected together by means of three-dimensional connecting walls 12.

In the example in question, the walls 12 are determined by a curved line C defined in a transverse plane orthogonal to the longitudinal axis X-X. The curve C has a point of inflexion I. However, as a variant, the curve C could be convex or concave and have no point of inflexion I.

Figure 4:
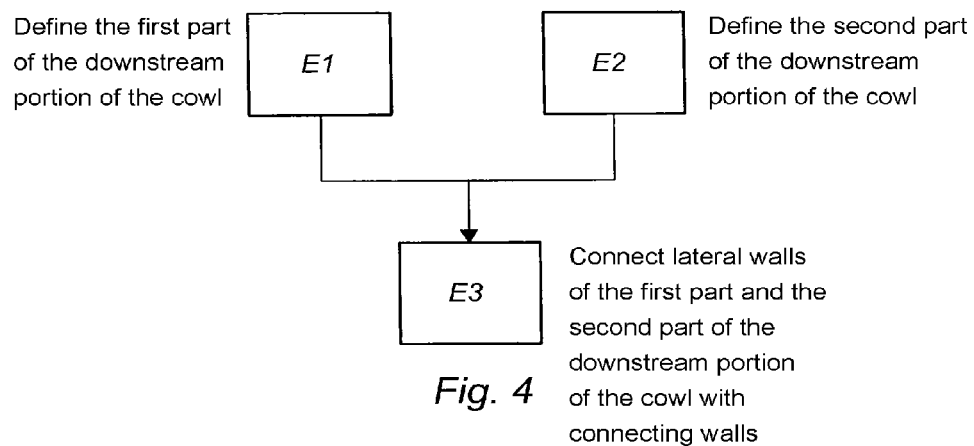
FIG. 4 is a diagram representing various possible steps of a method for designing a discharge system of a turbojet according to the invention.

FIG. 4 shows very schematically an example of a method for designing the downstream portion 5B of the cowl 5 of a main nozzle in order to define therein the slot 10 for discharging a ventilation flow such that the assembly forms an optimized discharge system with respect to performance for the turbojet.

This method takes as an input the characteristics of the slot 10, in particular the two angular sectors α on either side of the suspension mast 3 where the slot is absent, and the geometry of the portion 5A of the cowl 5 upstream of the slot 10.

In a first step E1, a first part 5B.1 of the downstream portion of the cowl 5 is defined by extending downstream the upstream portion 5A of the cowl up to a trailing edge 11A of the main nozzle T1, on either side of the suspension mast 3, along the two predefined angular sectors.

In a second step E2, a second part 5B.2 formed from an internal contour 10I of the slot 10 is defined. The second part 5B.2 notably has a trailing edge 11B with a diameter smaller than that of the trailing edge 11A associated with the first part 5B.1 of the downstream portion 5B of the cowl 5.

The last step E3 for defining the downstream portion 5B of the cowl consists in connecting the lateral ends of the first part 5B.1 and second part 5B.2 with the aid of three-dimensional connecting walls 12. These connecting walls can be defined by any design means available to those skilled in the art supplying smooth shapes.

Advantageously, the step E1 for designing the part 5B.1 includes taking account of the characteristics of the variants described above in the description of the first part 5B.1.

In an alternative variant embodiment of the method according to the invention, the first and second steps E1 and E2 can be reversed, the step E2 being carried out before the step E1.

The invention claimed is:

1. A discharge system of a separated twin-flow turbojet for an aircraft, supported by a suspension mast, said discharge system comprising:
   a main nozzle delimited by an annular cowl extending along a longitudinal axis, said cowl comprising a slot of annular shape which defines an upstream portion of the cowl and a downstream portion of the cowl, said slot configured to elect air and being traversed by the suspension mast of the turbojet,
   wherein the downstream portion of the cowl of the main nozzle comprises:
      a first part extending downstream from the upstream portion of the cowl to a first trailing edge, the first part extending circumferentially on respective sides of the suspension mast along a first angular sector and a second angular sector, the first part terminating the slot at respective circumferential ends of the first and second angular sectors, and
      a second part extending circumferentially along a third angular sector between the first and second angular sectors and which is formed from an internal contour of the slot, said second part extending downstream from the slot to a second trailing edge,
   wherein the first part is defined by a first generatrix line revolved about a length of the longitudinal axis along the first and second angular sectors, and the second part is defined by a second generatrix line revolved about the length of the longitudinal axis along the third angular sector, wherein the second generatrix line is offset radially inward from the first generatrix line,
   wherein a trailing edge of the main nozzle is defined by the first trailing edge and the second trailing edge, and the trailing edge of the main nozzle is non-axisymmetric, and
   wherein the first and second parts of the downstream portion are connected laterally to one another with a first connecting wall and a second connecting wall.

2. The discharge system as claimed in claim 1, wherein the first generatrix line is a straight line of the upstream portion of the cowl.

3. The discharge system as claimed in claim 1, wherein the first generatrix line is a concave curved line.

4. The discharge system as claimed in claim 1, wherein the first and second connecting walls are respectively defined by a curved line in a transverse plane orthogonal to the longitudinal axis.

5. The discharge system as claimed in claim 4, wherein the curved line has a point of inflexion.

6. The discharge system as claimed in claim 1, wherein the first and second connecting walls are respectively defined by a straight line in a transverse plane orthogonal to the longitudinal axis.

7. A separated twin-flow turbojet, which comprises the discharge system as described in claim 1.

8. A method of providing a discharge system of a separated twin-flow turbojet for an aircraft, said turbojet being supported by a suspension mast, the discharge system comprising a main nozzle delimited by an annular cowl extending along a longitudinal axis, said cowl comprising a slot of annular shape which defines an upstream portion of the cowl and a downstream portion of the cowl, said slot configured to elect air and being traversed by the suspension mast of the turbojet, the method comprising:
provide a downstream portion of the cowl of the main nozzle comprising:
- a first part extending downstream from the upstream portion of the cowl to a first trailing edge, the first part extending circumferentially on respective sides of the suspension mast along a first angular sector and a second angular sector, the first part terminating the slot at respective circumferential ends of the first and second angular sectors;
- a second part extending circumferentially along a third angular sector between the first and second angular sectors and which is formed from an internal contour of the slot, said second part extending downstream from the slot to a second trailing edge, said first trailing edge and said second trailing edge defining a trailing edge of the main nozzle which is non-axisymmetric, wherein the first part is defined by a first generatrix line revolved about a length of the longitudinal axis along the first and second angular sectors and the second part is defined by a second generatrix line revolved about the length of the longitudinal axis along the third angular sector, wherein the second generatrix line is offset radially inward from the first generatrix line, and connecting a first lateral end of the first part to a first lateral end of the second part with a first connecting wall, and connecting a second lateral end of the first part and a second lateral end of the second part with a second connecting wall.

9. The method as claimed in claim 8, wherein the first generatrix line is a straight line.

10. The method as claimed in claim 8, wherein the first generatrix line is a concave curved line.

* * * * *

UNITED STATES PATENT AND TRADEMARK OFFICE
CERTIFICATE OF CORRECTION

PATENT NO. : 9,915,227 B2
APPLICATION NO. : 13/950608
DATED : March 13, 2018
INVENTOR(S) : Matthieu Leyko et al.

Page 1 of 1

It is certified that error appears in the above-identified patent and that said Letters Patent is hereby corrected as shown below:

In the Specification

Column 4, Line 45, change "sector a is defined" to --sector $\alpha$ is defined--;

In the Claims

Column 6, Line 14, Claim 1 change "to elect air" to --to eject air--; and

Column 7, Line 2, Claim 8 change "to elect air" to --to eject air--.

Signed and Sealed this
Eighteenth Day of February, 2020

Andrei Iancu
*Director of the United States Patent and Trademark Office*